UNITED STATES PATENT OFFICE.

ROBERT E. SCHMIDT, OF ELBERFELD, GERMANY, ASSIGNOR TO THE FARBEN-FABRIKEN, VORMALS FR. BAYER & CO., OF SAME PLACE.

BLUE-BLACK ALIZARIN DYE.

SPECIFICATION forming part of Letters Patent No. 599,425, dated February 22, 1898.

Application filed September 1, 1897. Serial No. 650,419. (Specimens.) Patented in Germany October 14, 1894, No. 84,509; in France December 3, 1894, No. 243,316; in England December 8, 1894, No. 23,927, and in Italy December 31, 1894, XXIX, 37,890, and LXXIV, 206.

*To all whom it may concern:*

Be it known that I, ROBERT E. SCHMIDT, doctor of philosophy and chemist, (assignor to the FARBENFABRIKEN, VORMALS FR. BAYER & Co., of Elberfeld, Germany,) a subject of the Emperor of Germany, residing at Elberfeld, Germany, have invented a new and useful Improvement in the Manufacture of Dyestuffs Derived from Alizarin, (for which the aforesaid Farbenfabriken has already obtained Letters Patent in Germany, No. 84,509, dated October 14, 1894; in England, No. 23,927, dated December 8, 1894; in France, No. 243,316, dated December 3, 1894, and in Italy, Reg. Gen., Vol. 29, No: 37,890, Reg. Attest, Vol. 74, No. 206, dated December 31, 1894,) of which the following is a clear and exact description.

My invention relates to a process for producing a new alizarin dyestuff, which process consists in, first, condensing purpurin with a primary aromatic amin, with or without the addition of suitable condensing agents, such as boric acid or the like, and, secondly, treating the condensation product thus obtainable with a suitable sulfonating agent. The aforesaid condensation product has most probably the following general formula:

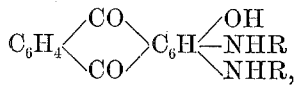

in which formula R represents an aromatic radical, such as phenyl, ortho or para tolyl, xylyl, or the like.

In carrying out this process practically I can proceed as follows, the parts being by weight: A mixture of thirty parts of purpurin, three hundred parts of anilin, and twenty parts of crystallized boric acid is heated during from two to four hours at from 150° to 160° centigrade in an enameled vessel provided with a stirring apparatus. By this operation the boric ether of the condensation product is obtained, which for the most part separates from the reaction mixture during the process in the form of little crystals having metallic luster. After the reaction is finished the mixture is cooled down to about 50° centigrade and poured, under stirring, into a solution of three hundred parts of hydrochloric acid (15° Baumé) in fifteen hundred parts of water, a precipitate being thus separated. The precipitate, partly consisting of the condensation product itself and partly of its boric ether, is filtered, washed with water, and dried. It can be directly sulfonated.

In case it is desired to obtain the condensation product in a chemically pure state the raw product is first repeatedly treated with warm dilute soda-lye in order to decompose the boric ether contained therein. Then it is washed with cold dilute hydrochloric acid, dried, and crystallized from anilin. In pure state it represents dark glittering crystals and has the following properties: It is insoluble in water, in dilute acids, and in dilute alkali lyes, easily soluble in hot anilin with a violet blue, in cold pyridin and chloroform with a violet color, difficultly soluble in cold alcohol, more readily soluble in hot alcohol with a violet color. On the addition of a small quantity of a concentrated soda-lye to the alcoholic solution the color of the latter is changed into blue green. The color of its solution in concentrated sulfuric acid is greenish blue and changes into violet either after heating for a short time or if the solution be allowed to stand for some time. By heating the condensation product with sulfuric acid of 60° Baumé it is decomposed, purpurin being regenerated. In order to sulfonate the said condensation product from anilin and purpurin, I can proceed as follows: The dry raw condensation product which is obtained, as above described, from thirty parts of purpurin and three hundred parts of anilin is ground and added, with continuous stirring, to four hundred parts of concentrated sulfuric acid, (66° Baumé.) The resulting mixture is stirred, keeping the temperature at from about twenty to sixty degrees centigrade until the precipitate obtained by pouring a test portion of the mixture into a large quantity of water readily dissolves in boiling water. At this stage the above mixture is poured into three thousand parts of water with continuous stirring. To the thus-obtained mixture one hundred parts of common salt are added. The dyestuff thus precipitated is filtered off and washed with a solution of common salt. Of course the sulfonation of the hereinbefore-mentioned condensation product can be carried out by treating the latter with any other sulfonating agent yielding the same result. The dyestuff is thus obtained as a dark violet-brown paste and can be used in this state for dyeing and printing. In case it is required to prepare the dyestuff in dry state the paste is mixed with a small quantity of sodium carbonate, soda-lye, or the like, dried, and pulverized. The alkali is added in order to neutralize the small quantity of acid which may be contained in the paste, the chemical nature of the dyestuff being not affected by this operation.

The dry dyestuff has the following properties: It represents a dark powder difficultly soluble in cold water, readily soluble in hot water with a violet-red color, soluble in dilute soda-lye with a dull violet-blue color, soluble in a dilute ammonia solution with a violet-red color which turns into bluish violet if an excess of ammonia liquor be added. The dyestuff is easily soluble in hot alcohol with a violet-red color which changes into violet blue on the addition of an excess of ammonia liquor and into greenish blue on adding a small quantity of soda-lye to the alcoholic solution. If a test portion of my new dyestuff be heated with sulfuric acid of 60° Baumé, it is decomposed, the anilin radicals and the sulfo groups being eliminated while purpurin is regenerated, which can be isolated and recognized in the usual manner.

The new coloring-matter yields from bluish-gray to bluish-black even shades on chromium mordants, which shades are fast to light, to fulling, and against the action of acids.

Products having nearly the same properties as the above dyestuff produced from anilin and purpurin are obtained if in place of anilin corresponding quantities of orthotoluidin, paratoluidin, or xylidin be used or if the raw commercial anilin be employed in the hereinbefore-defined process. As a matter of course other condensing agents acting in the same or a similar manner can be used instead of boric acid used in the above example, the general process being not altered thereby. It is also possible to carry out the condensation of purpurin and aromatic amins without the addition of condensing agents. In this case the reaction can only be finished if the mixture of the two bodies be treated for a longer while and at a higher temperature.

Having now particularly described my invention and in what manner the same is to be performed, what I claim as new, and desire to secure by Letters Patent, is—

1. The process of producing new alizarin dyestuffs, which process consists in first condensing purpurin with a primary amin, which process may be carried out under the addition of condensing agents, such as boric acid, and secondly treating with sulfonating agents, such as concentrated sulfuric acid, the thus-obtainable condensation products having most probably the general formula

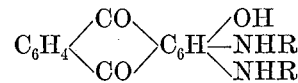

in which formula R represents an aromatic radical such as phenyl, ortho or para tolyl, xylyl, substantially as described.

2. The process for producing a new alizarin dyestuff, which process consists in first condensing purpurin with anilin, which process may be carried out under the addition of condensing agents, such as boric acid, and secondly treating with sulfonating agents, such as concentrated sulfuric acid, the thus-obtainable product of condensation having most probably the formula:

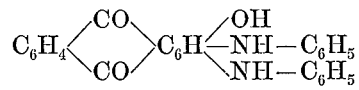

substantially as described.

3. As new articles of manufacture, the alizarin dyestuffs being sulfo-acids of bodies having the general formula

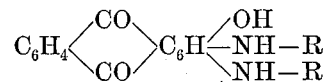

in which formula R represents an aromatic radical such as phenyl, ortho or para tolyl, xylyl, being decomposed under regeneration of purpurin when heated with a sulfuric acid of 60° Baumé, yielding from grayish-blue to bluish-black shades on chromium-mordanted wool, which shades are fast to light, to fulling and against the action of acid.

4. The intermediate condensation product obtainable from purpurin and anilin, representing in pure state dark glittering crystals insoluble in water, in dilute acids and in dilute alkali lyes, easily soluble in hot anilin with a violet blue, in cold pyridin in chloroform and in hot alcohol with a violet color, soluble in concentrated sulfuric acid with a greenish-blue color which by and by changes into violet, being decomposed under regeneration of purpurin when heated with a sulfuric acid of 60° Baumé, substantially as described.

5. As a new article of manufacture, the alizarin dyestuff being a sulfo-acid of the body obtained from purpurin and anilin, having most probably, the formula:

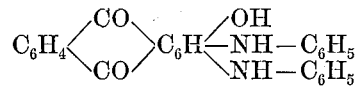

being in dry state a dark powder, difficultly soluble in cold water, readily soluble in hot water with a violet-red color, soluble in dilute soda-lye with a dull violet-blue color soluble in a dilute ammonia solution with a violet-red color which turns into bluish violet on the addition of an excess of ammonia liquor, easily soluble in hot alcohol with a violet-red color which changes into violet blue on adding an excess of ammonia liquor and into greenish blue on the addition of a small quantity of soda-lye being decomposed under regeneration of purpurin when heated with a sulfuric acid of 60° Baumé, yielding from bluish-gray to bluish-black even shades on chromium-mordanted wool, which shades are fast to light, to fulling and against the action of acids.

ROBERT E. SCHMIDT.

Witnesses:
H. F. HESS,
OTTO KÖNIG.